(12) United States Patent
Satoh

(10) Patent No.: US 7,460,664 B2
(45) Date of Patent: Dec. 2, 2008

(54) HANDSFREE SYSTEM AND INCOMING CALL ANSWERING METHOD IN HANDSFREE SYSTEM

(75) Inventor: Takao Satoh, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 811 days.

(21) Appl. No.: 11/032,688

(22) Filed: Jan. 10, 2005

(65) Prior Publication Data

US 2005/0180556 A1    Aug. 18, 2005

(30) Foreign Application Priority Data

Jan. 14, 2004    (JP)    ................ 2004-006483

(51) Int. Cl.
  *H04M 1/00*    (2006.01)
  *H04M 3/00*    (2006.01)
  *H04M 9/00*    (2006.01)

(52) U.S. Cl. ................ 379/420.02; 379/373.01; 455/569.1

(58) Field of Classification Search ........ 379/372, 379/373.01, 377, 386, 387.01, 387.02, 420.01–420.04; 455/569.1, 569.2
See application file for complete search history.

(56) References Cited

U.S. PATENT DOCUMENTS 6,281,925 B1    8/2001    Kosaka 6,470,196 B1 *  10/2002   Yamashita ............... 455/567

FOREIGN PATENT DOCUMENTS

| DE | 100 23 783 | 11/2001 |
|---|---|---|
| JP | 09-321830 | 12/1997 |
| JP | 11-298574 | 10/1999 |
| JP | 11 298574 | 10/1999 |
| JP | 2002-271474 | 9/2002 |
| WO | WO 02/25970 | 3/2002 |

* cited by examiner

*Primary Examiner*—Curtis Kuntz
*Assistant Examiner*—Tuan D Nguyen
(74) *Attorney, Agent, or Firm*—Brinks Hofer Gilson & Lione

(57) ABSTRACT

In a system having a handsfree function to answer an incoming call handsfree and another function, when an incoming call arrives, a handsfree unit informs a user about an arrival of the incoming call and sets a user operation invalid state in which any user operation is made invalid during a predetermined period. The handsfree unit regards a user operation performed after the predetermined period passes as an operation for the incoming call, and performs incoming call answering processing corresponding to the user operation. When a user operation is performed in the user operation invalid state, the handsfree unit causes the user operation to be invalid.

13 Claims, 11 Drawing Sheets

FIG. 2

| INDIVIDUAL UNIT-OPERATING MEMBER | COMMON UNIT-OPERATING MEMBER ||
| --- | --- | --- |
| | SHORT-TIME OPERATION MEMBER | LONG-TIME OPERATION MEMBER |
| ⋮ | ⋮ | ⋮ |

HANDSFREE SYSTEM AND INCOMING CALL ANSWERING METHOD IN HANDSFREE SYSTEM

BACKGROUND OF THE INVENTION

1. Technical Field

The present invention relates to handsfree systems and incoming call answering methods in the handsfree systems, and more particularly, a handsfree system to answer an incoming call handsfree and an incoming call answering method in the handsfree system.

2. Description of the Related Art

Automobile telephones are used handsfree by installing an in-vehicle apparatus in a vehicle and by connecting a cellular telephone to the in-vehicle apparatus. The in-vehicle apparatus has intelligent functions, such as a handsfree function (automobile telephone function), an in-vehicle navigation function, and an audio function.

According to the in-vehicle apparatus, when a user originates a call in the vehicle, the in-vehicle apparatus is connected to a recipient's telephone via the cellular telephone, a wireless base station, and a public telephone network, so that the user can talk with the recipient. Also, the user can talk with a caller by answering an incoming call from a telephone of the caller.

In a first incoming call answering method in the in-vehicle apparatus having the handsfree function, when an incoming call arrives, a ringing tone is generated or a message indicating the arrival of the incoming call is displayed on a display unit. Then, when a user performs a predetermined operation, incoming call answering processing starts, and connection with a caller's telephone is established.

In a second incoming call answering method, after an incoming call arrives, incoming call answering processing automatically starts in accordance with a timer or the number of ringing tones (the number of ringing times) functioning as a trigger, and connection with a caller's telephone is established.

In a third incoming call answering method, a user pressing any hard key is regarded as operating a conversation start key (an any-key answer function), incoming call answering processing starts, and connection with a caller's telephone is established.

As described above, the in-vehicle apparatus has the in-vehicle navigation function and the audio function as well as the handsfree telephone function. Also, operation members, such as keys, buttons, and a volume control, arranged on an operation panel and other operation members arranged around a display unit are categorized into individual operation members unique to corresponding functions and common operation members. For example, an up or down button used as a zoom-in or zoom-out button for maps for navigation also functions as a volume-up or volume-down button for handsfree operation. When an incoming call arrives in the in-vehicle apparatus, common operation members come to be used as operation members for handsfree operation.

As described above, if an incoming call arrives when a user of an in-vehicle apparatus operates a button, for example, to zoom in (or out) a map in a navigation mode, the button function is changed so as to be used as a volume control for a handsfree telephone. However, the user may continue the operation thinking of the button as a zoom-in or zoom-out button for navigation. Thus, the volume of the handsfree telephone turns up (or down). Then, if the user starts a conversation with a caller by operating a conversation start key in accordance with the first incoming call answering method or if the user automatically starts conversation with the caller after a predetermined period passes in accordance with the second incoming call answering method, a loud voice of the caller is suddenly output or a voice of the caller is too quiet to be heard.

Also, in accordance with the third incoming call answering method (the any-key answer function), if the user continues zooming in (or out) the map, in other words, the user continues pressing the up or down button after the incoming call arrives, the same state as when the user operates the conversation start key (conversation state) occurs even if the user does not intend to perform incoming call answering processing.

Also, in the third incoming call answering method (the any-key answer function), if the user originates a call without recognizing the incoming call after the incoming call arrives, the user unavoidably answers the incoming call in contrast to the user's intention of originating a call.

FIG. 12 illustrates a known sequence for an incoming call. Before an incoming call arrives, operation members are used for navigation. A user operation UOP1 using an operation member is entered to a navigation system 3 through a user interface 4, and the navigation system 3 performs processing corresponding to the user operation UOP1. In this state, when the incoming call arrives in a handsfree system 2 from a cellular telephone 1, the handsfree system 2 changes the user interface 4 so as to be used for handsfree operation. If a zoom-in or zoom-out button for maps is operated when the incoming call arrives and the any-key answer function is active, continuing to operate the zoom-in or zoom-out button (user operation UOP2) in order to change the size of a map after the arrival of the incoming call is regarded as answering the incoming call, and a loud voice or a quiet voice of a caller may be output against the user's intention.

A handsfree system for causing a user to easily recognize the arrival of an incoming call is suggested in Japanese Unexamined Patent Application Publication No. 11-298574. According to this handsfree system, when an incoming call arrives, an incoming call answering screen that is remarkably different from other screens is displayed on a display so as to cause the user to recognize the arrival of the incoming call. Accordingly, the user recognizes the arrival of the incoming call, and performs an operation suitable for a handsfree telephone.

However, in the known handsfree system, the problems caused by continuing to operate the same button after the arrival of an incoming call cannot be solved. In other words, problems, such as a loud voice suddenly output from a caller, starting a conversation with a caller without performing answering processing, and answering an incoming call in contrast to an intention of originating a call, cannot be solved.

SUMMARY OF THE INVENTION

An object of the present invention is to prevent a problem caused by continuing to operate the same button after the arrival of an incoming call by causing any user operation to be invalid during a predetermined period when the incoming call arrives.

Another object of the present invention is to prevent an output of a caller's voice that is too loud or too quiet by causing any user operation to be invalid during a predetermined period when an incoming call arrives.

Another object of the present invention is to prevent unintentional answering of an incoming call, for example, a problem of starting a conversation with a caller without performing incoming call answering processing, by causing any user operation to be invalid during a predetermined period when the incoming call arrives.

Another object of the present invention is to be capable of rapidly answering an incoming call when an arrival of the incoming call is recognized.

Another object of the present invention is to cause a user to easily recognize an arrival of an incoming call by causing any user operation to be invalid during a predetermined period when the incoming call arrives and by generating an error sound and re-reporting the arrival of the incoming call when a user operation is performed in the predetermined period.

The above objects are achieved by the following first and second incoming call answering methods in a system having a handsfree function to answer an incoming call handsfree and another function.

According to the first incoming call answering method of the present invention, when the incoming call arrives, the arrival of the incoming call is reported to a user, and a user operation invalid state is set in which any user operation using an operation member is made invalid for a predetermined period. A user operation performed after the predetermined period passes is regarded as an operation for the incoming call, and incoming call answering processing corresponding to the user operation is performed. When a user operation is performed in the user operation invalid state, (1) the user operation is made invalid, and then the user operation invalid state is released, (2) the user operation is made invalid, and a period of the user operation invalid state is extended, or (3) it is determined whether the operation member is a long-time operation member or a short-time operation member, the user operation is made invalid and then the user operation invalid state is released when the operation member is a short-time operation member, and the user operation is made invalid and the period of the user operation invalid state is extended when the operation member is a long-time operation member.

According to the second incoming call answering method of the present invention, when the incoming call arrives, the arrival of the incoming call is reported to a user and a user operation invalid state is set in which any user operation is made invalid for a first period. A user operation performed in the user operation invalid state is made invalid, and a period of the user operation invalid state is extended for another first period when the user operation is performed. The user operation invalid state in which any user operation is made invalid for a second period is set after the first period passes without any user operation. A user operation performed after the second period passes is regarded as an operation for the incoming call, and incoming call answering processing corresponding to the user operation is performed. A user operation performed in the second period is made invalid, and then the user operation invalid state is released.

Also, the above objects are achieved by the following first and second handsfree systems to answer an incoming call handsfree.

The first handsfree system according to the present invention includes an operation unit; a detection unit for detecting an arrival of the incoming call; an incoming call reporting unit for reporting the arrival of the incoming call to a user; a changing unit for changing the operation unit so as to be used for a handsfree operation when the incoming call arrives; a user operation invalid/valid control unit for causing any user operation conducted using the operation unit to be invalid during a predetermined period when the incoming call arrives and for causing a user operation performed after the predetermined period passes to be valid; and a handsfree answering processing unit for performing handsfree answering processing in accordance with the user operation performed in a user operation valid state in which the user operation is made valid. In a user operation invalid state in which any user operation is made invalid, the user operation invalid/valid control unit (1) causes a user operation to be invalid, and then releases the user operation invalid state, (2) causes a user operation to be invalid, and extends a period of the user operation invalid state, or (3) causes a user operation to be invalid, and then releases the user operation invalid state when the user operation is performed using a short-time operation member as the operation unit, and causes a user operation to be invalid, and extends a period of the user operation invalid state when the user operation is performed using a long-time operation member as the operation unit.

The second handsfree system of the present invention includes an operation unit; a detection unit for detecting an arrival of the incoming call; an incoming call reporting unit for reporting the arrival of the incoming call to a user; a changing unit for changing the operation unit so as to be used for a handsfree operation when the incoming call arrives; a user operation invalid/valid control unit for causing any user operation to be invalid during a first period when the incoming call arrives, for causing a user operation performed in a user operation invalid state in which any user operation is made invalid to be invalid and extending a period of the user operation invalid state for another first period when the user operation is performed, for causing any user operation to be invalid during a second period after the first period passes without any user operation, and for causing a user operation performed after the second period passes to be valid; and an incoming call answering processing unit for regarding the user operation performed after the second period passes as an operation for the incoming call and performing incoming call answering processing corresponding to the user operation.

According to the present invention, by causing any user operation to be invalid during a predetermined period when an incoming call arrives, a problem caused by continuing to operate the same button after the arrival of the incoming call can be prevented.

According to the present invention, by causing any user operation to be invalid during a predetermined period when an incoming call arrives, an output voice of a caller that is too loud or too quiet can be prevented.

According to the present invention, by causing any user operation to be invalid during a predetermined period when an incoming call arrives, unintentional answering of the incoming call, for example, a problem of starting a conversation with a caller without performing incoming call answering processing can be prevented.

According to the present invention, when an arrival of an incoming call is recognized, answering the incoming call can be rapidly performed by consecutively operating an operation member.

According to the present invention, by causing any user operation to be invalid during a predetermined period and by generating an error sound and re-reporting the arrival of the incoming call when a user operation is performed in the predetermined period, a user easily recognizes the arrival of the incoming call.

BRIEF DESCRIPTION OF THE DRAWINGS

FIG. 2 shows an example in which operation members are categorized into individual unit-operating members and common unit-operating members and in which the common unit-operating members are categorized into short-time operation members and long-time operation members;

DESCRIPTION OF THE PREFERRED EMBODIMENTS

According to preferred embodiments of the present invention, in a handsfree system, when an incoming call arrives the incoming call is reported to a user, and any user operation is made invalid during a predetermined period. A user operation performed after the predetermined period passes is regarded as a handsfree operation for the incoming call, and incoming call answering processing is performed.

Figure 1:
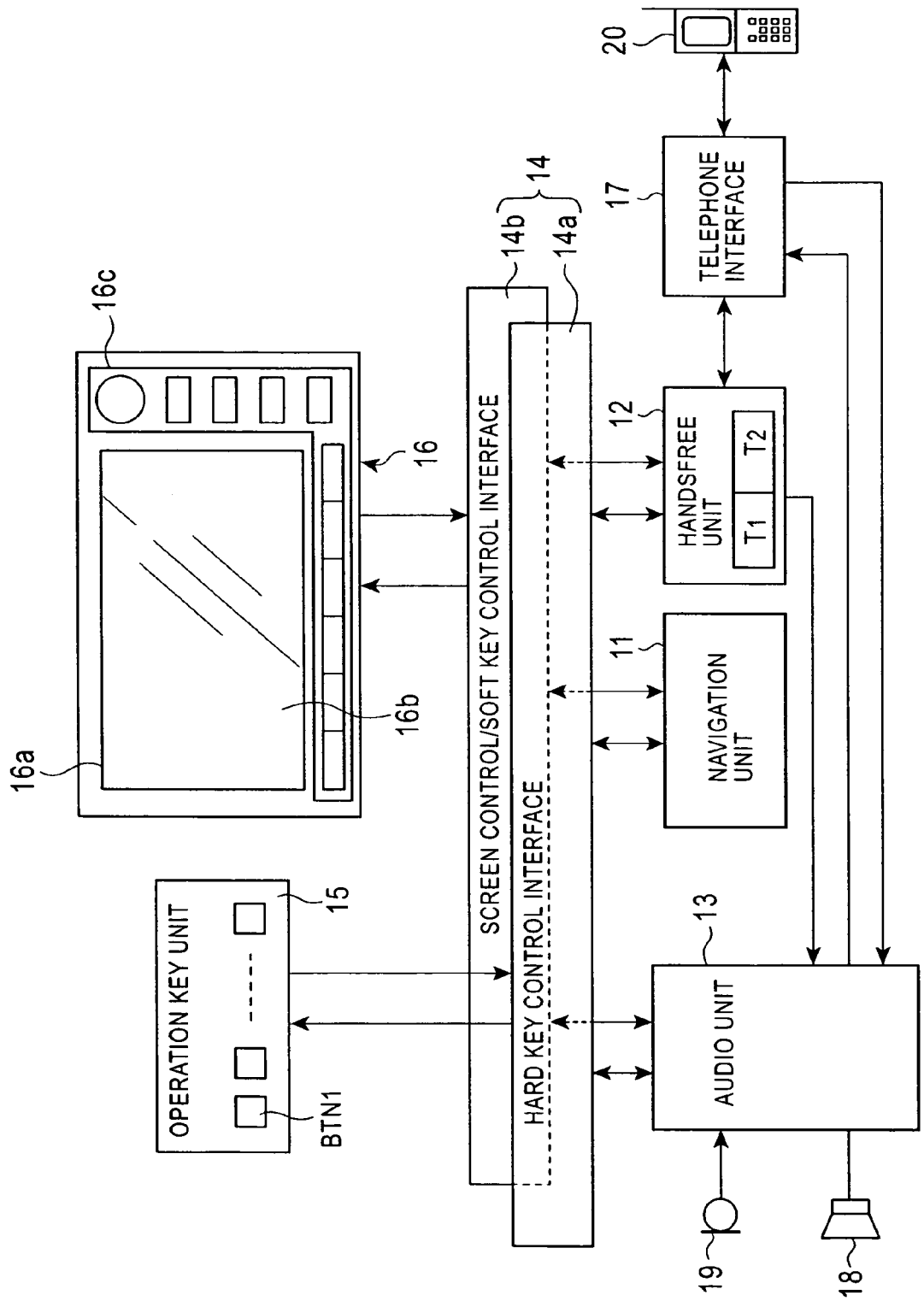
FIG. 1 shows the general structure of an in-vehicle apparatus according to the present invention.

FIG. 1 shows the general structure of an in-vehicle apparatus according to the present invention. The in-vehicle apparatus includes a navigation unit 11 for controlling in-vehicle navigation, a handsfree unit 12 for controlling a handsfree telephone, and an audio unit 13. These units are connected to an operation key unit 15, a display unit 16, a remote controller (not shown), and the like through a user interface 14.

The handsfree unit 12 has a microcomputer configuration. The handsfree unit 12 includes a processor, a program memory, a data memory, and the like. A first period T1 and a second period T2 are stored in the data memory. The audio unit 13 appropriately and selectively produces music from an audio source, such as a tuner or a compact disk (CD) player (not shown), a ringing tone (a ringing signal) from a ringing tone generation unit, and an error sound when an operation is not appropriate from an error sound generation unit. The user interface 14 includes a hard key control interface 14a and a screen control/soft key control interface 14b. The hard key control interface 14a functions as an interface between each unit and the operation key unit 15, and the screen control/soft key control interface 14b controls screens or soft keys.

The display unit 16 includes a touch panel 16a. A map and various menus are displayed on a screen 16b so that data and commands can be entered by touching the touch panel 16a. Also, an operation key part 16c may be provided to the side and below the screen 16b. Keys and buttons in the operation key unit 15 and the operation key part 16c are categorized into common keys and buttons that are used for the navigation unit 11, the handsfree unit 12, and the audio unit 13 in common; and individual keys and buttons that are used for the navigation unit 11, the handsfree unit 12, or the audio unit 13 individually. Alternatively, the keys and buttons in the operation key unit 15 and the operation key part 16c are categorized into long-time operation keys (continuous operation keys), such as a volume control, a scroll key, and a zoom-in or zoom-out key for maps; and short-time operation keys (quickly pressed keys). The user interface 14 stores the above-mentioned categories, and an instruction by an operation key is appropriately sent to a corresponding unit in accordance with a state of the in-vehicle apparatus. FIG. 2 shows an example in which operation members are categorized into individual unit-operating members and common unit-operating members. The common unit-operating members are categorized into short-time operation members and long-time operation members.

A telephone interface 17 is provided between a cellular telephone 20 and the handsfree unit 12 so that control data including incoming call control data and outgoing call control data can be transferred between the cellular telephone 20 and the handsfree unit 12. The telephone interface 17 includes a sending and receiving unit so that a user can talk with a caller or a recipient through the cellular telephone 20, a mobile telephone network, and a general public network (not shown). Also, under handsfree control, the telephone interface 17 causes the audio unit 13 to produce a sound signal of the caller or the recipient from a speaker 18 and obtains a sound signal of the user entered from a microphone 19 through the audio unit 13.

Figure 3:
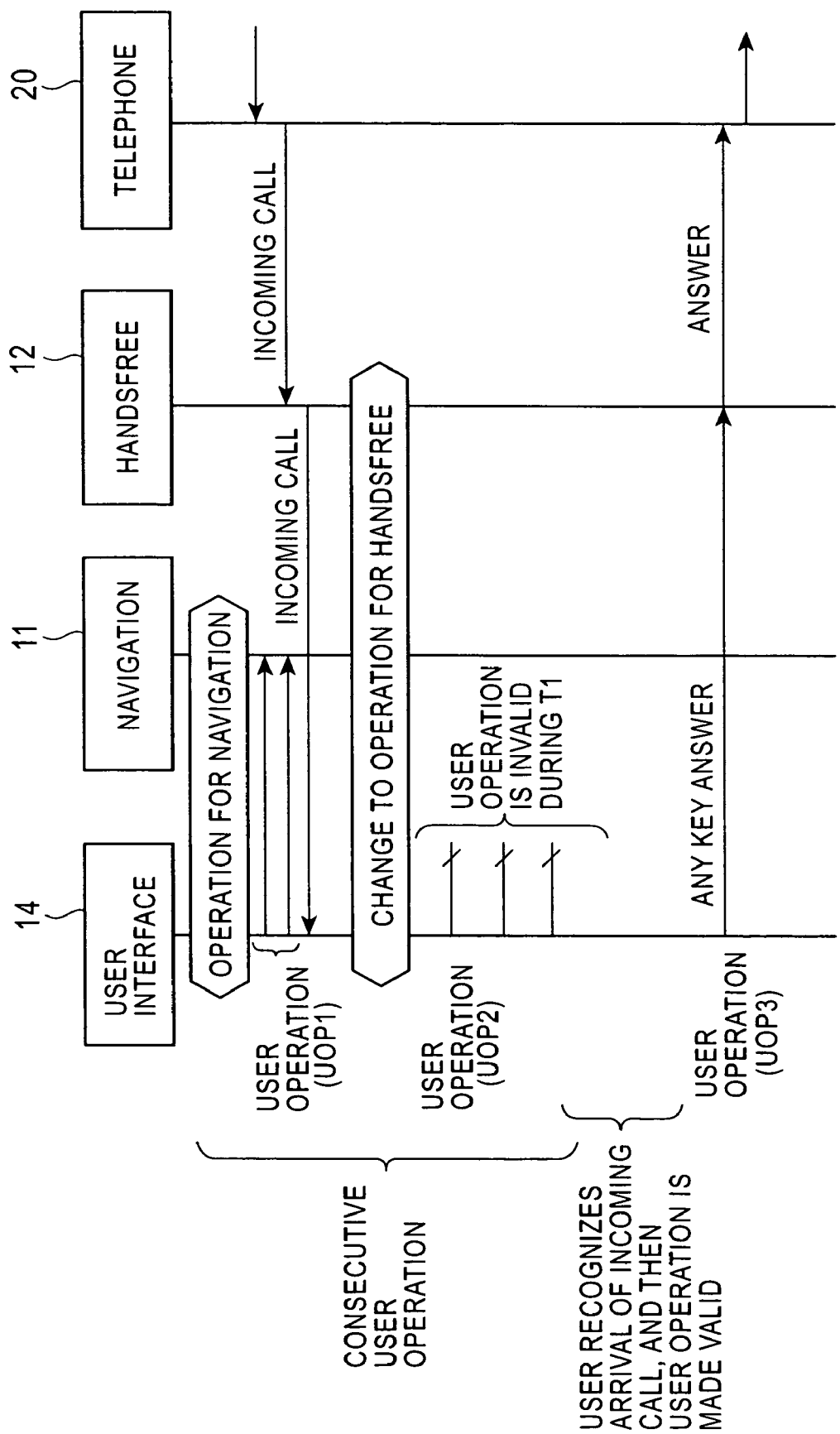
FIG. 3 illustrates a control sequence according to the present invention.

FIG. 3 illustrates a control sequence according to the present invention. Before an incoming call arrives, an operation section functions, for example, for navigation. A user operation UOP1 using the operation section is supplied to the navigation unit 11 through the user interface 14, and the navigation unit 11 performs processing corresponding to the user operation UOP1. Here, in the user operation UOP1, a button BTN1 functioning as a zoom-in or zoom-out button is operated to zoom in or zoom out a map. For handsfree operation, the button BTN can function as a volume-up or volume-down button. Also, the button BTN1 can be used for an any-key answer function.

In such a state, when an incoming call arrives in the handsfree unit 12 through the cellular telephone 20, the handsfree unit 12 changes the user interface 14 so as to be used for handsfree operation (the button BTN1 is changed so as to be used as a volume-up or volume down button for handsfree operation), and causes any user operation to be invalid during the first period T1. Thus, even if a user operates the button BTN1 functioning as a zoom-in or zoom-out button when the incoming call arrives and if the user continues the operation (a user operation UPO2) in order to zoom in or zoom out the map after the arrival of the incoming call, the user operation UOP2 is made invalid and the volume of the handsfree telephone is not turned up or turned down. If the user does not perform any operation during the first period T1, the handsfree unit 12 releases the state in which any user operation is made invalid. Then, the handsfree unit 12 recognizes a user operation UOP3 as a valid handsfree operation, and performs processing corresponding to the user operation UOP3.

Figure 4:
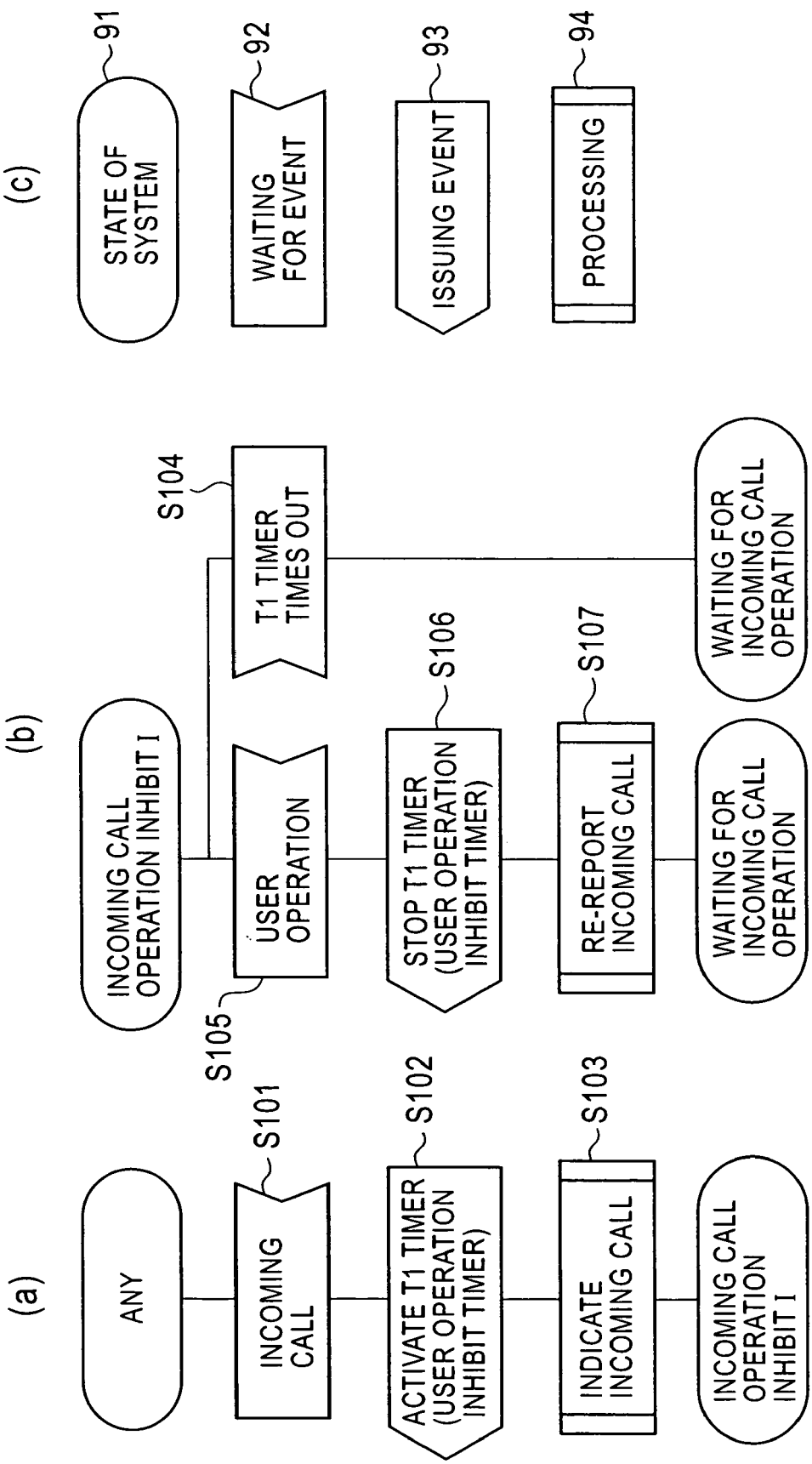
FIG. 4 is a flowchart showing an incoming call answering process according to a first embodiment of the present invention performed by a handsfree unit.

FIG. 4 is a flowchart showing an incoming call answering process according to a first embodiment of the present invention performed by the handsfree unit 12. Here, as shown in part (c) of FIG. 4, a shape 91 represents the state of a system, a shape 92 represents waiting for an event, a shape 93 represents issuing an event, and a shape 94 represents performing processing in the flowchart shown in parts (a) and (b) of FIG. 4.

In any state, when an incoming call arrives (step S101), the handsfree unit 12 activates a user operation inhibit timer (T1 timer) for a first period T1 (an incoming call operation inhibit state I: step S102). The first period T1 is, for example, 500 msec. The handsfree unit 12 gives the user interface 14 an instruction to change an operation member so as to be used for handsfree operation, displays a message, such as "Telephone call from AAA", on the display unit 16 so as to be superimposed on a rendered map, as shown in FIG. 5 (step S103), and causes the audio unit 13 to appropriately produce a ringing tone from the speaker 18.

If the T1 timer times out without any user operation in the incoming call operation inhibit state I (step S104), the incoming call operation inhibit state I is released into an incoming call operation waiting state. Then, if a user operation is performed, handsfree telephone answering processing corresponding to the user operation is performed. In the incoming call operation waiting state, the handsfree unit 12 displays soft keys, such as "answer" and "hold", as shown in FIG. 6, in addition to the display details shown in FIG. 5. Processing for answering the incoming call can be performed by touching the soft key "answer", instead of operating a hard key.

Figure 5:
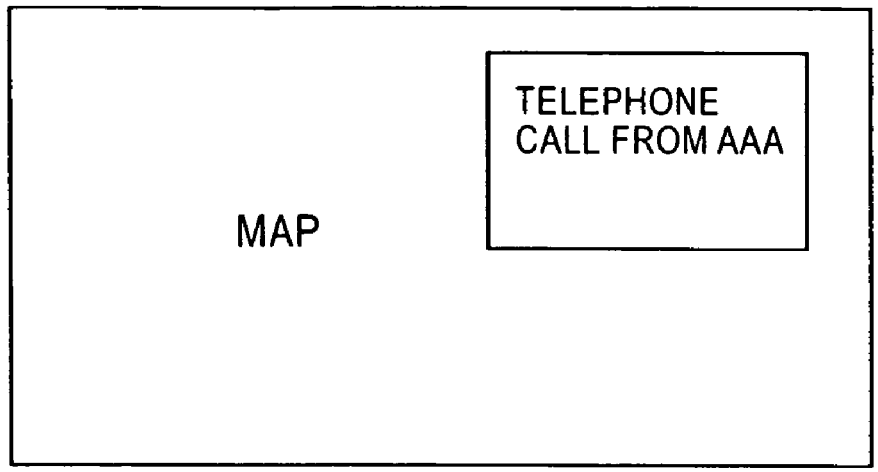
FIG. 5 shows an example of a screen for reporting an incoming call.
Figure 6:
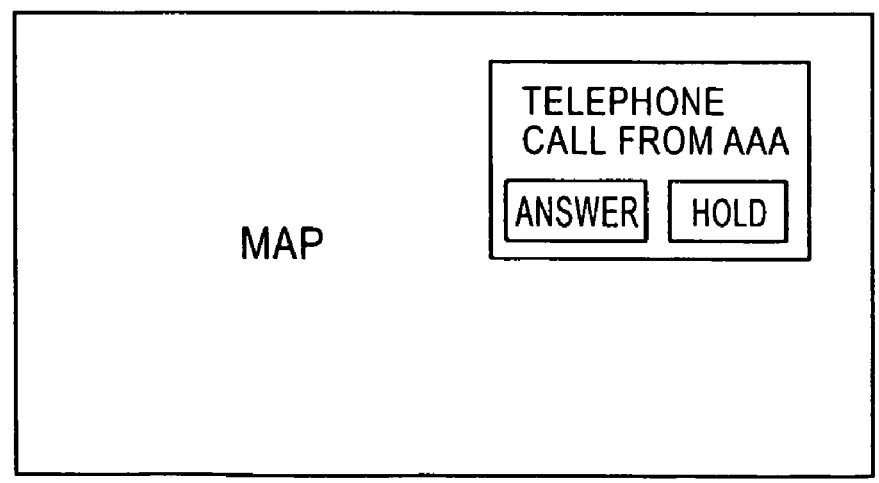
FIG. 6 shows an example of a screen display in an incoming call operation waiting state.

If a user operation is performed in the incoming call operation inhibit state I (step S105), the handsfree unit 12 causes the user operation to be invalid, generates an error sound or displays an error message on the display unit 16, releases the incoming call operation inhibit state I (step S106), and re-reports a message indicating the arrival of the incoming call, as shown in FIG. 5 (step S107). Then, in the incoming call operation waiting state, handsfree telephone answering processing corresponding to the user operation is performed.

Figure 7A:
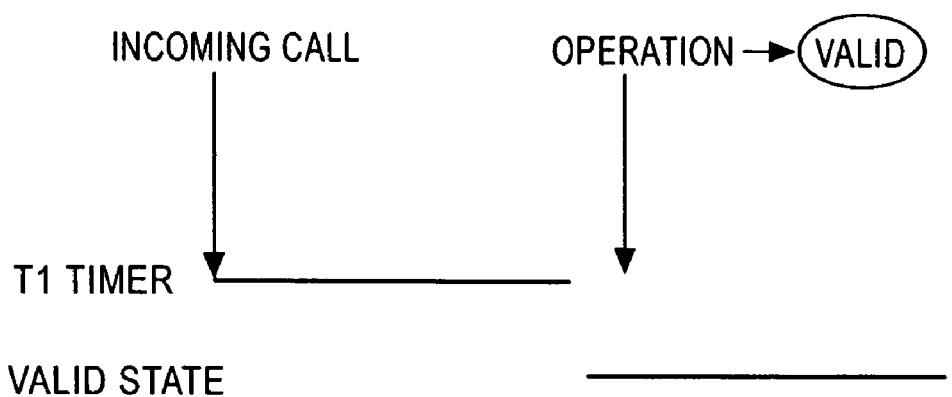
FIGS. 7A and 7B are time charts for the process shown in FIG. 4.
Figure 7B:
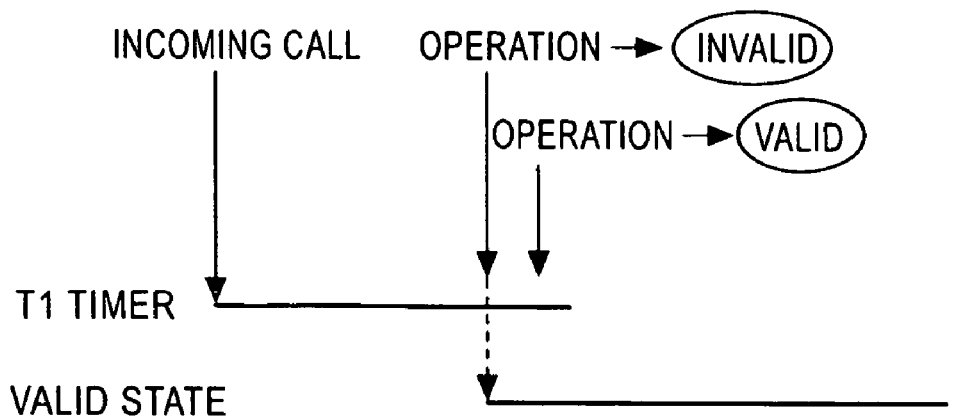

FIGS. 7A and 7B are time charts of the process shown in FIG. 4. FIG. 7A shows a case where no user operation is performed in the incoming call operation inhibit state I during the first period T1, and a user operation is performed in the incoming call operation waiting state (valid state) after the first period T1 passes. In this case, the user operation is regarded as a valid operation, and incoming call answering processing corresponding to the user operation is performed.

FIG. 7B shows a case where a first user operation performed in the incoming call operation inhibit state I during the first period T1 is made invalid and a second user operation performed after releasing the incoming call operation inhibit state I due to the first user operation is regarded as a valid operation. Then, incoming call answering processing corresponding to the second user operation is performed.

The process according to the first embodiment shown in FIG. 4 is applicable to a case where operation keys and buttons are short-time operation keys and buttons (quickly pressed keys and buttons). In particular, when a user wants to rapidly answer an incoming call without waiting for the first period T1, performing two consecutive user operations starts incoming call answering processing.

Figure 8:
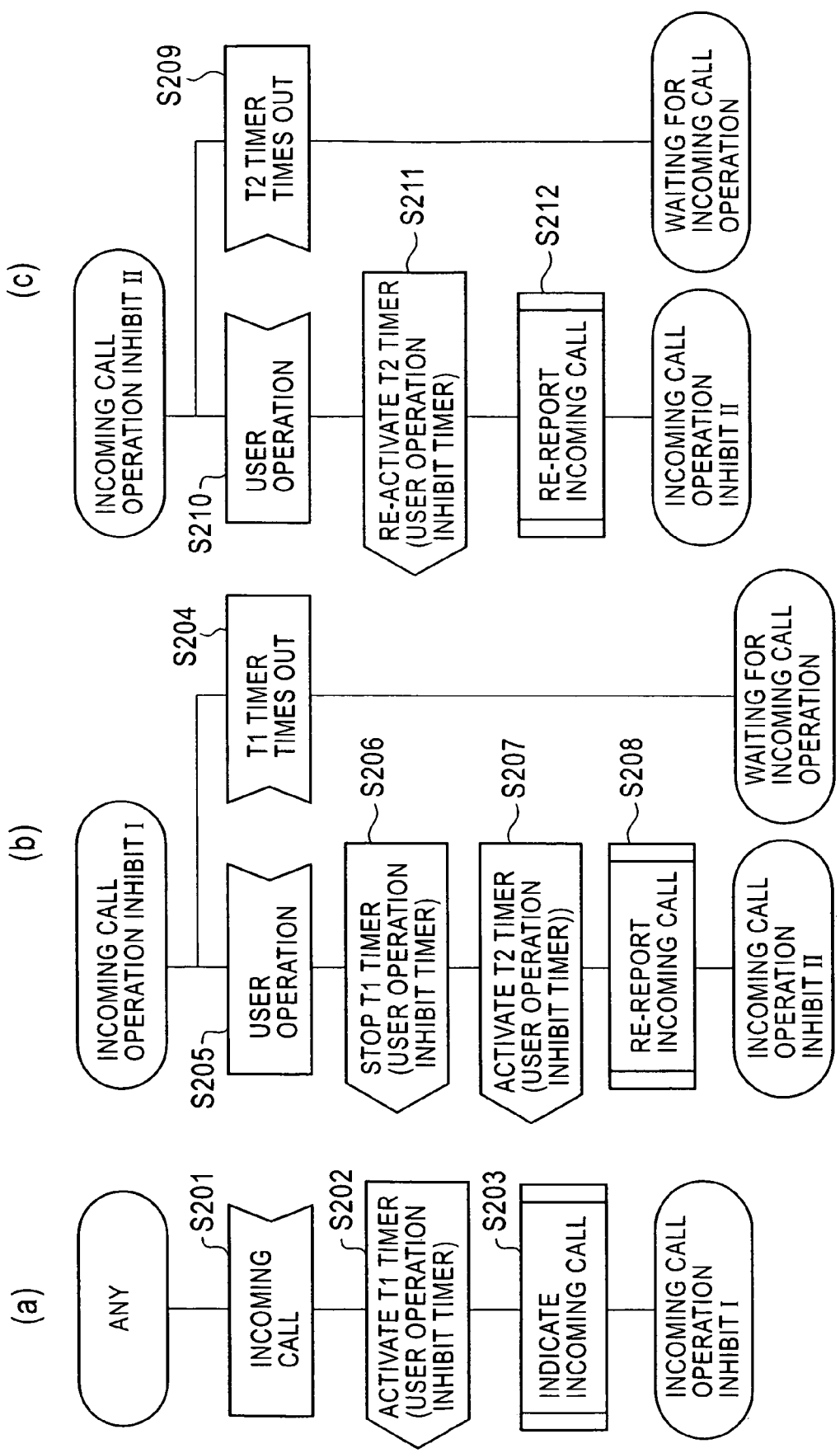
FIG. 8 is a flowchart showing an incoming call answering process according to a second embodiment of the present invention.

FIG. 8 is a flowchart showing an incoming call answering process according to a second embodiment of the present invention performed by the handsfree unit 12. According to the second embodiment, when a user operation is performed in a user operation invalid state, the user operation is made invalid, and the period of the user operation invalid state is extended. This process is applicable to a case where operation keys are long-time consecutive operation keys, such as a volume control, a scroll key, and a zoom-in or zoom-out key.

In any state, when an incoming call arrives (step S201), the handsfree unit 12 activates the user operation inhibit timer (T1 timer) for a first period T1 (the incoming call operation inhibit state I: step S202). The first period T1 is, for example, 500 msec. The handsfree unit 12 gives the user interface 14 an instruction to change an operation member so as to be used for handsfree operation, displays a message, such as "Telephone call from AAA", on the display unit 16 so as to be superimposed on a rendered map, as shown in FIG. 5 (step S203), and causes the audio unit 13 to produce a ringing tone from the speaker 18.

If the T1 timer times out without any user operation in the incoming call operation inhibit state I (step S204), the incoming call operation inhibit state I is released into an incoming call operation waiting state. Then, if a user operation is performed, handsfree telephone answering processing corresponding to the user operation is performed. In the incoming call operation waiting state, the handsfree unit 12 displays the soft keys, such as "answer" and "hold", as shown in FIG. 6, in addition to the display details shown in FIG. 5. Processing for answering the incoming call can be performed by touching the soft key "answer", instead of operating a hard key.

If a user operation is performed in the incoming call operation inhibit state I (step S205), the handsfree unit 12 causes the user operation to be invalid. The handsfree unit 12 generates an error sound or displays an error message on the display unit 16, and releases the incoming call operation inhibit state I (step S206). Then, the handsfree unit 12 activates a user operation inhibit timer (T2 timer) for a second period T2 (an incoming call operation inhibit state II: step S207). The second period T2 is, for example, 500 msec. Then, a message indicating the arrival of the incoming call is re-reported, as shown in FIG. 5 (step S208).

If the T2 timer times out without any user operation in the incoming call operation inhibit state II (step S209), the incoming call operation inhibit state II is released into an incoming call operation waiting state. Then, if a user operation is performed, handsfree telephone answering processing corresponding to the user operation is performed. In the incoming call operation waiting state, the handsfree unit 12 displays the soft keys, such as "answer" and "hold", as shown in FIG. 6, in addition to the display details shown in FIG. 5. Processing for answering the incoming call can be performed by touching the soft key "answer", instead of operating a hard key.

If a user operation is performed in the incoming call operation inhibit state II (step S210), the handsfree unit 12 causes the user operation to be invalid. The handsfree unit 12 generates an error sound or displays an error message on the display unit 16, re-activates the T2 timer (the incoming call inhibit state II: step S211), and re-reports a message indicating the arrival of the incoming call, as shown in FIG. 5 (step S212). Then, the process returns to step S210, and repeats processing in steps S210 to S212 until a user operation is not performed during the second period T2.

Figure 9A:
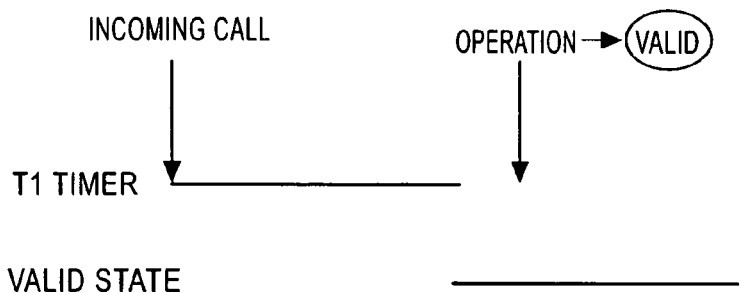
FIGS. 9A, 9B, and 9C are time charts for the process shown in FIG. 8.
Figure 9B:
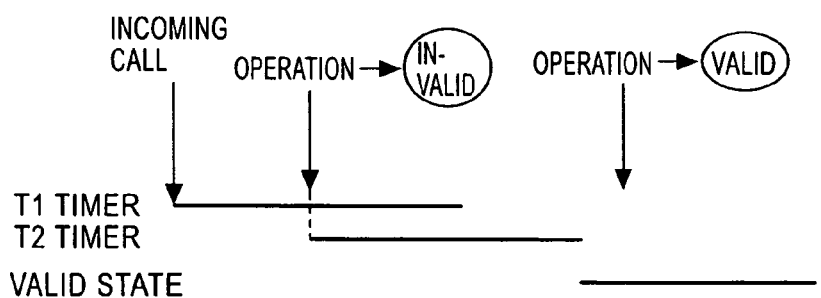
Figure 9C:
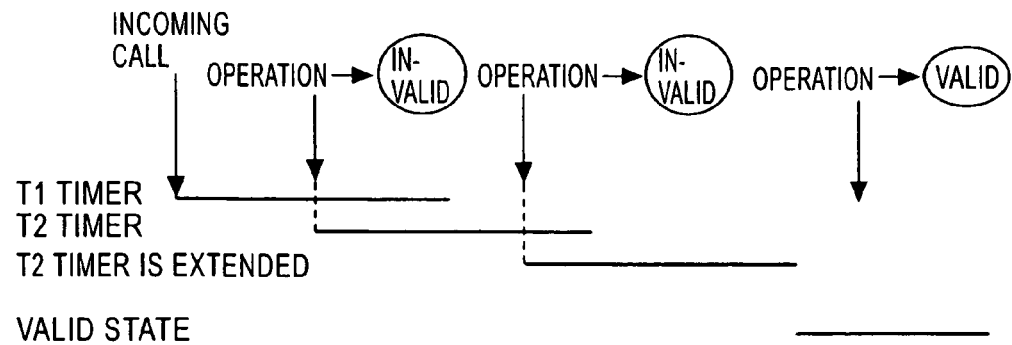

FIGS. 9A, 9B, and 9C are time charts of the process shown in FIG. 8. FIG. 9A shows a case where no user operation is performed in the incoming call operation inhibit state I during the first period T1, and a user operation is performed in the incoming call operation waiting state (valid state) after the first period T1 passes. In this case, the user operation is regarded as a valid operation, and incoming call answering processing corresponding to the user operation is performed.

FIG. 9B shows a case where a first user operation performed in the incoming call operation inhibit state I during the first period T1 is made invalid, and the incoming call operation inhibit state II for the second period T2 starts. No user operation is performed in the incoming call operation inhibit state II during the second period T2, and a second user operation is performed in the incoming call operation waiting state (valid state) after the second period T2 passes. In this case, the second user operation is regarded as a valid operation, and incoming call answering processing corresponding to the second user operation is performed.

FIG. 9C shows a case where a first user operation performed in the incoming call operation inhibit state I during the first period T1 is made invalid, and the incoming call operation inhibit state II for the second period T2 starts. A second user operation performed in the incoming call operation inhibit state II during the second period T2 is made invalid, and the incoming call operation inhibit state II for the second period T2 re-starts. Then, no user operation is performed in the second incoming call operation inhibit state II, and a third user operation is performed in the incoming call operation waiting state (valid state) after the second period T2 passes. In this case, the third user operation is regarded as a valid operation, and incoming call answering processing corresponding to the third user operation is performed.

The incoming call answering process according to the second embodiment shown in FIG. 8 is applicable to a case where operation keys are long-time consecutive operation keys. In other words, even if a key operation using a long-time consecutive operation key is performed when an incoming call arrives and the key operation continues to be performed after the arrival of the incoming call, the key operation after the arrival of the incoming call can be made invalid. Even if, for example, the button BTN1 being used as a zoom-in or zoom-out key is changed so as to be used as a volume-up or volume-down key due to the arrival of the incoming call, no trouble occurs.

Figure 10:
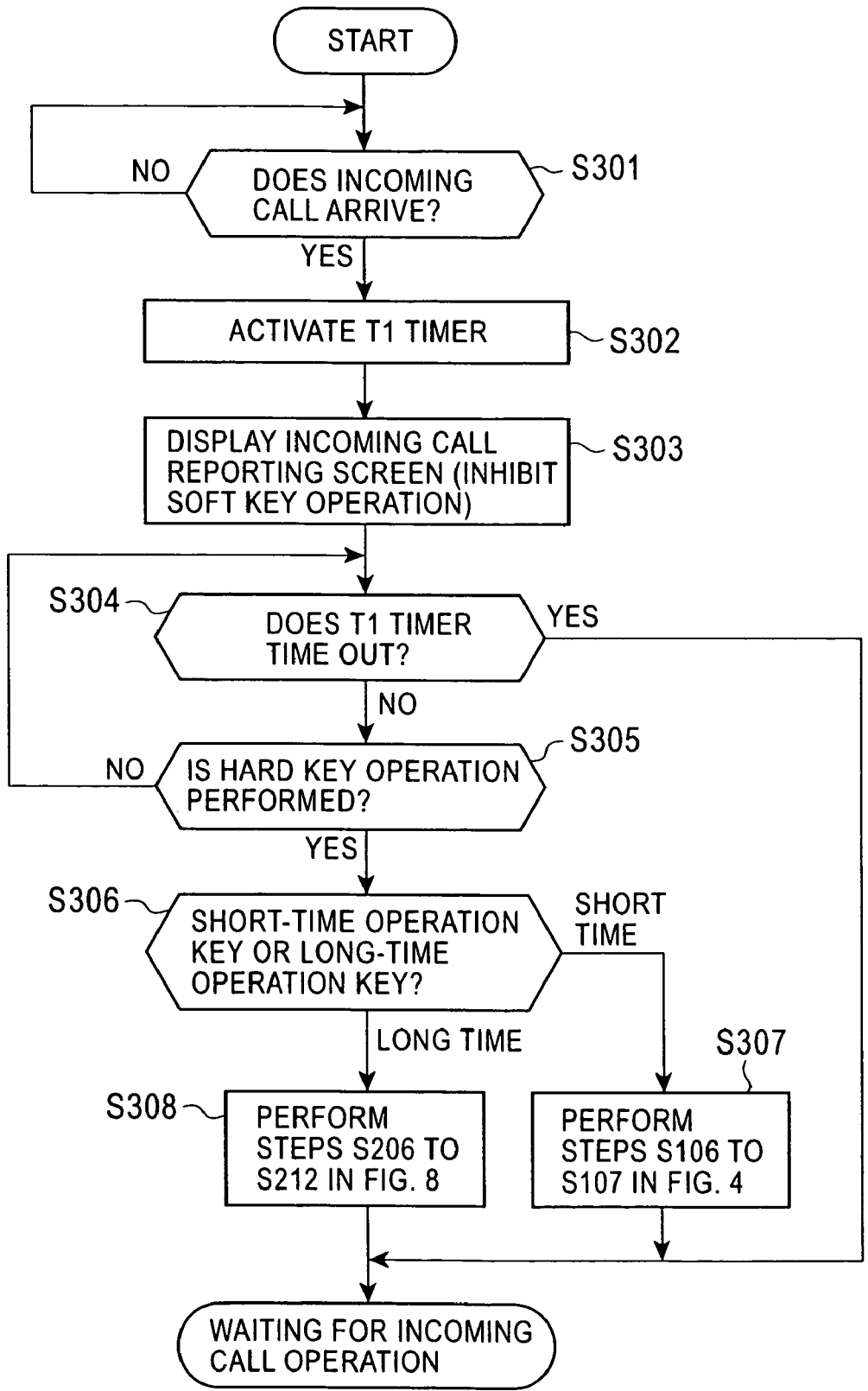
FIG. 10 is a flowchart showing an incoming call answering process according to a third embodiment of the present invention.

FIG. 10 is a flowchart showing an incoming call answering process according to a third embodiment of the present invention performed by the handsfree unit 12. This process is a combination of the process according to the first embodiment shown in FIG. 4 and the process according to the second embodiment shown in FIG. 8.

The handsfree unit 12 checks if an incoming call arrives (step S301). If the incoming call arrives, the handsfree unit 12 activates the user operation inhibit timer (T1 timer) for the first period T1 (step S302). The handsfree unit 12 changes an operation member so as to be used for handsfree operation, displays the screen indicating the arrival of the incoming call shown in FIG. 5 on the map, and generates a ringing tone (step S303). Here, soft keys are not displayed on the display screen.

Then, the handsfree unit 12 determines whether or not the T1 timer times out (step S304). If the T1 timer times out, an incoming call operation waiting state (user operation valid state) is set. If the T1 timer does not time out, the handsfree unit 12 determines whether or not a user operation using a hard key is performed (step S305). If a user operation is not performed, the handsfree unit 12 performs the processing in step S304 again.

If a user operation is performed in step S305, the handsfree unit 12 determines whether the key used for the user operation is a long-time operation key or a short-time operation key (step S306). If a short-time operation key is used, the handsfree unit 12 performs the processing in steps S106 to S107 in FIG. 4 (step S307). The handsfree unit 12 causes the user operation to be invalid and releases the incoming call operation inhibit state I. If a long-time operation key is used, the handsfree unit 12 performs the processing in steps S206 to S212 in FIG. 8 (step S308).

According to the third embodiment, it is determined whether an operated key is a short-time operation key or a long-time operation key, and the most appropriate processing can be performed.

Figure 11:
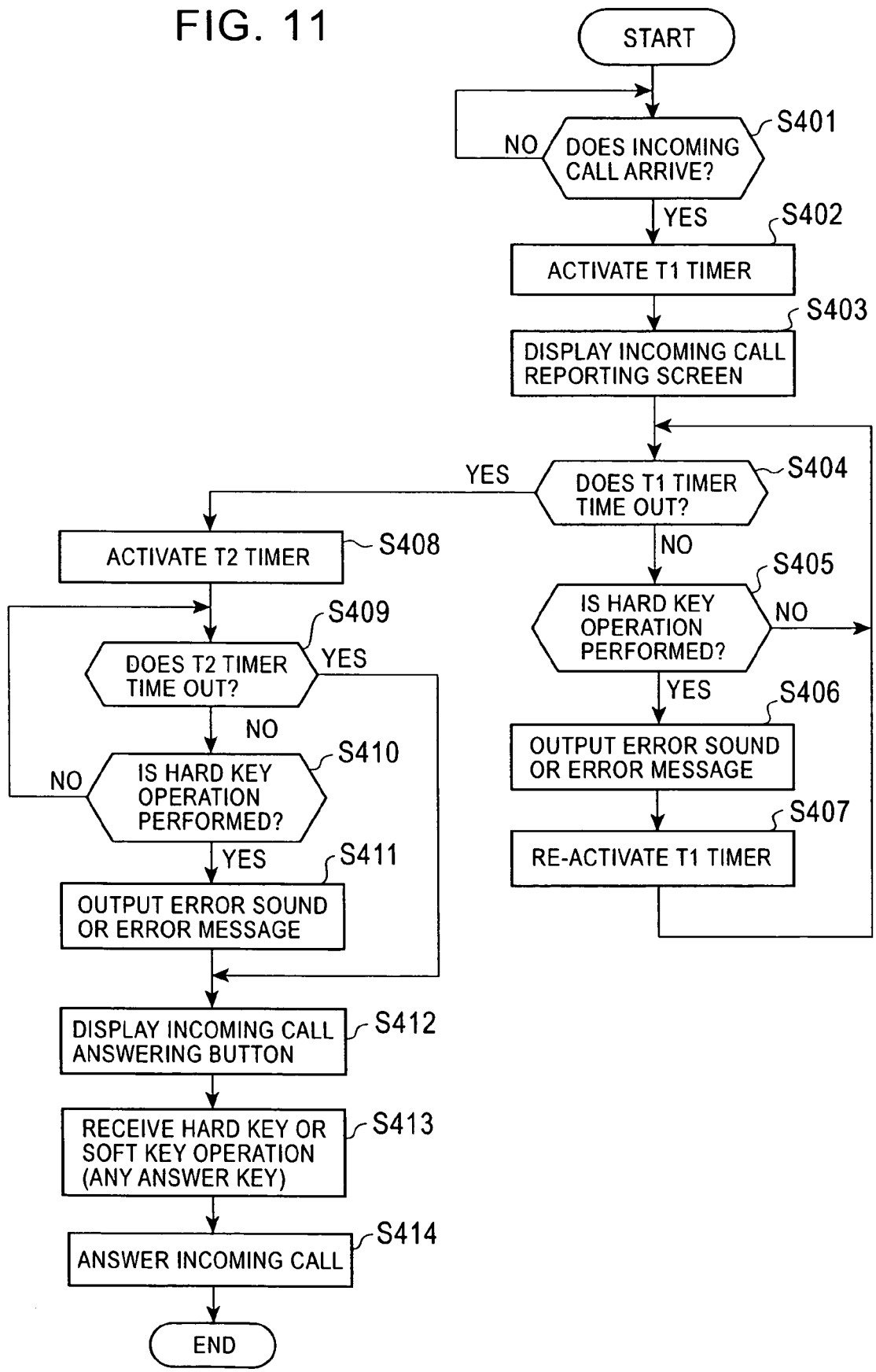
FIG. 11 is a flowchart showing an incoming call answering process according to a fourth embodiment of the present invention.
Figure 12:
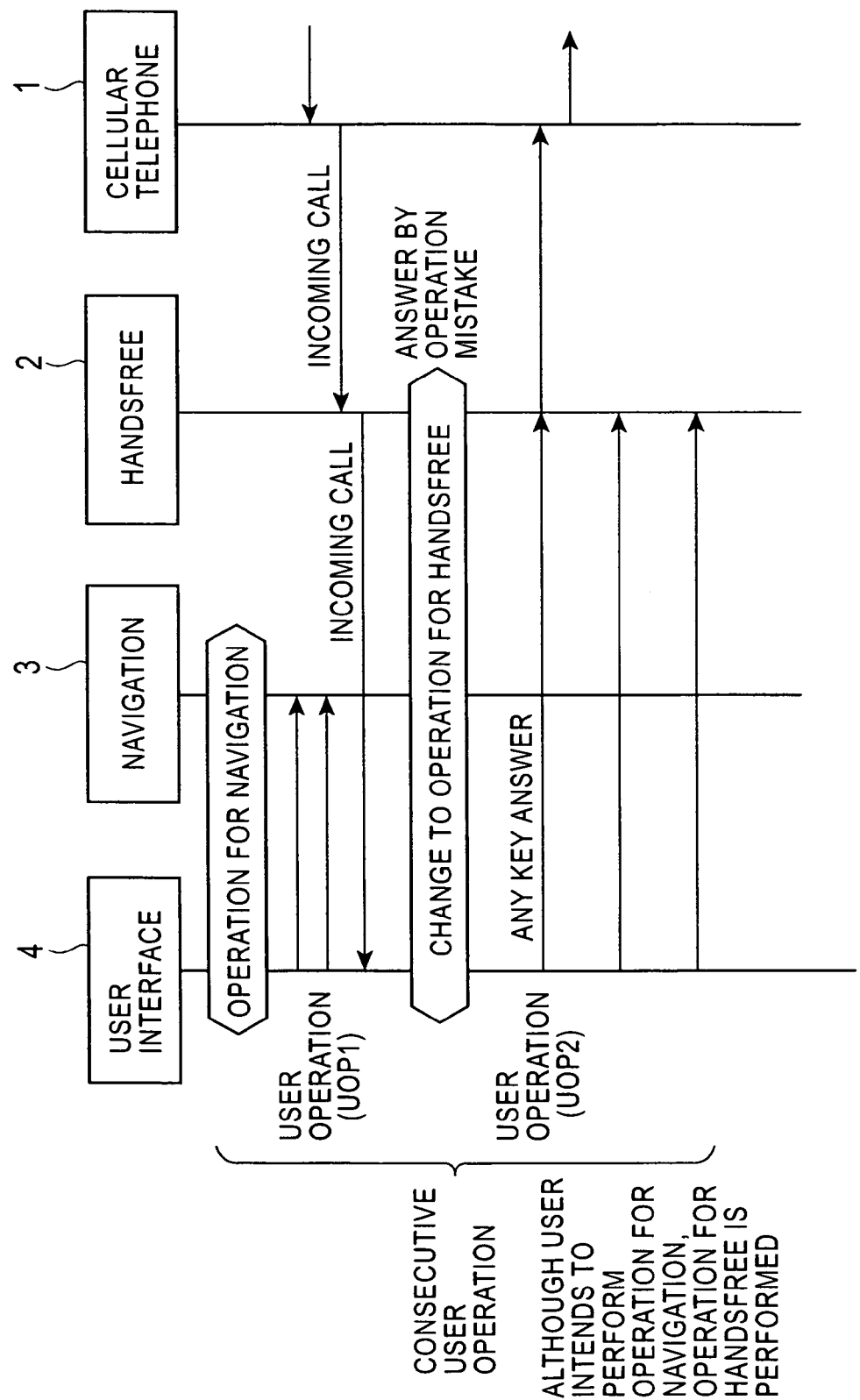
FIG. 12 illustrates a known sequence for responding to an incoming call.

FIG. 11 is a flowchart showing an incoming call answering process according to a fourth embodiment of the present invention performed by the handsfree unit 12. According to the fourth embodiment, the most appropriate incoming call answering processing is performed without determining whether an operation key is a short-time operation key or a long-time operation key.

The handsfree unit 12 checks if an incoming call arrives (step S401). If an incoming call arrives, the handsfree unit 12 activates the incoming call inhibit timer (T1 timer) for the first period T1 (=200 msec) (step S402), and gives an instruction to change an operation member so as to be used for handsfree operation. Also, the handsfree unit 12 displays the screen indicating the arrival of the incoming call shown in FIG. 5 on the map, and generates a ringing tone (step S403).

Then, the handsfree unit 12 determines whether or not the T1 timer times out (step S404). If the T1 timer has not timed out, the handsfree unit 12 checks if a user operation using a hard key is performed (step S405). If no user operation is performed, the process returns to step S404. If a user operation is performed, the handsfree unit 12 generates an error sound or an error message (step S406). The handsfree unit 12 re-activates the T1 timer (step S407), and the process returns to step S404.

If the T1 timer times out in step S404, the handsfree unit 12 activates the user operation inhibit timer (T2 timer) for the second period T2 (=300 msec) (step S408). Then, the handsfree unit 12 determines whether or not the T2 timer times out (step S409). If the T2 timer has not timed out, the handsfree unit 12 checks if a user operation using a hard key is performed (step S410). If a user operation is not performed, the process returns to step S409.

If the T2 timer times out in step S409 without any operation using a hard key, a user operation valid state is set, and the handsfree unit 12 displays the soft keys shown in FIG. 6 in (step S412). If a user operates a hard key or a soft key (step S413), the incoming call answering processing is performed (step S414).

If a user operation is performed before the T2 timer times out in step S410, the handsfree unit 12 outputs an error sound or an error message (step S411). The handsfree unit 12 causes the user operation to be invalid, and releases the user operation inhibit state into the user operation valid state. Then, the handsfree unit 12 performs the processing in steps S412 to S414.

If an operation using a long-time operation key is performed when an incoming call arrives in the process according to the fourth embodiment, the processing in steps S404 to S407 is performed. Incoming call answering processing is not performed until an operation using a long-time operation key is not performed for a predetermined period or more. As a result of this, even if an operation using a long-time operation key is performed when an incoming call arrives and the operation continues to be performed after the arrival of the incoming call, the key operation after the arrival of the incoming call can be made invalid. Even if a key BTN1 being used as a zoom-in or zoom-out key is changed so as to be used as a volume-up or volume-down key due to the arrival of the incoming call, no trouble occurs.

Also, since the first period T1 is shorter than the second period T2, if a short-time operation key is used, the process proceeds to step S408 quickly. Then, processing as in steps S104 to S107 shown in FIG. 4 can be performed.

As described above, according to the fourth embodiment, the most appropriate incoming call answering processing can be performed without determining whether an operation key is a short-time operation key or a long-time operation key.

It is therefore intended that the foregoing detailed description be regarded as illustrative rather than limiting, and that it be understood that it is the following claims, including all equivalents, that are intended to define the spirit and scope of this invention.

The invention claimed is:

1. An incoming call answering method in a system having a handsfree function to answer an incoming call handsfree and at least one other function that is different from the handsfree function, and at least one operation member configured to control one of a plurality of the functions depending on which function is in an active state, comprising:
   reporting the arrival of the incoming call when the incoming call arrives, and setting a user operation invalid state in which any user operation using the operation member is made invalid during a predetermined period;
   regarding a user operation performed after the predetermined period passes as an operation for the incoming call; and
   performing incoming call answering processing corresponding to the user operation;
   wherein when a user operation is performed in the user operation invalid state, the user operation is made invalid and either the user operation invalid state is released or a period of the user operation invalid state is extended.

2. The incoming call answering method according to claim 1, wherein:
   when a user operation is performed in the user operation invalid state, it is determined whether the operation member is a long-time operation member or a short-time operation member;
   when the operation member is a short-time operation member, the user operation is made invalid and the user operation invalid state is released; and
   when the operation member is a long-time operation member, the user operation is made invalid and a period of the user operation invalid state is extended.

3. The incoming call answering method according to claim 1, wherein the operation member is used both for the handsfree function and at least one of the at least one other function.

4. The incoming call answering method according to claim 1, wherein when the user operation is performed in the user operation invalid state, a user operation invalid sound is generated and the arrival of the incoming call is re-reported.

5. A handsfree incoming call answering method in a system having a handsfree function to answer an incoming call handsfree and at least one other function that is different from the handsfree function, and at least one operation member configured to control one of a plurality of the functions depending on which function is in an active state, comprising:
   reporting the arrival of the incoming call when the incoming call arrives, and setting a user operation invalid state in which any user operation is made invalid during a first period;
   causing a user operation performed in the user operation invalid state to be invalid, and extending a period of the user operation invalid state for another first period when the user operation is performed;
   setting the user operation invalid state in which any user operation is made invalid during a second period after the first period passes without any user operation;
   regarding a user operation performed after the second period passes as an operation for the incoming call, and performing incoming call answering processing corresponding to the user operation; and
   causing a user operation performed during the second period to be invalid and releasing the user operation invalid state.

6. The handsfree incoming call answering method according to claim 5, wherein the first period is set to be shorter than the second period.

7. The handsfree incoming call answering method according to claim 5, wherein a user operation member is used both for the handsfree function and at least one of the at least one other function.

8. The handsfree incoming call answering method according to claim 5, wherein when the user operation is performed in the user operation invalid state, a user operation invalid sound is generated and the arrival of the incoming call is re-reported.

9. A handsfree system to answer an incoming call handsfree, comprising:
   operation means;
   detection means for detecting the arrival of the incoming call;
   incoming call reporting means for reporting the arrival of the incoming call to a user;
   changing means for changing the operation means so as to be used for a handsfree operation;
   user operation invalid/valid control means for causing any user operation using the operation means to be invalid during a predetermined period when the incoming call arrives and for causing a user operation performed after the predetermined period passes to be valid; and
   handsfree answering processing means for performing handsfree answering processing in accordance with the user operation performed in a user operation valid state in which the user operation is made valid;
   wherein when a user operation is performed in a user operation invalid state, the user operation is made invalid and either the user operation invalid state is released or a period of the user operation invalid state is extended.

10. The handsfree system according to claim 9, further comprising determination means for determining whether the operation means is a long-time operation member or a short-time operation member, wherein:
   when a user operation using the short-time operation member as the operation means is performed, the user operation invalid/valid control means causes the user operation using the short-time operation member to be invalid, and then releases the user operation invalid state; and
   when a user operation using the long-time operation member as the operation means is performed, the user operation invalid/valid control means causes the user operation using the long-time operation member to be invalid, and extends a period of the user operation invalid state.

11. A handsfree system to answer an incoming call handsfree, comprising:
   operation means;
   detection means for detecting the arrival of the incoming call;
   incoming call reporting means for reporting the arrival of the incoming call to a user;
   changing means for changing the operation means so as to be used for a handsfree operation;
   user operation invalid/valid control means for causing any user operation to be invalid during a first period when the incoming call arrives, for causing a user operation performed in a user operation invalid state to be invalid and extending a period of the user operation invalid state for another first period when the user operation is performed, for causing any user operation to be invalid during a second period after the first period passes without any user operation, and for causing a user operation performed after the second period passes to be valid; and incoming call answering processing means for regarding the user operation performed after the second period passes as an operation for the incoming call and performing incoming call answering processing corresponding to the user operation.

12. The handsfree system according to claim 11, wherein the first period is set to be shorter than the second period.

13. The handsfree system according to claim 11, wherein when a user operation is performed in the second period, the user operation invalid/valid control means causes the user operation to be invalid and releases the user operation invalid state.

* * * * *